United States Patent
Harris et al.

(10) Patent No.: US 11,618,358 B2
(45) Date of Patent: Apr. 4, 2023

(54) RETRACTABLE COVER ASSEMBLIES THAT REMOVABLY COVER GAPS BETWEEN VEHICLE SEATS AND CENTER CONSOLES

(71) Applicant: Toyota Motor Engineering & Manufacturing North America, Inc., Plano, TX (US)

(72) Inventors: Ryan C. Harris, Saline, MI (US); Scott L. Frederick, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 299 days.

(21) Appl. No.: 16/791,401

(22) Filed: Feb. 14, 2020

(65) Prior Publication Data

US 2021/0253006 A1  Aug. 19, 2021

(51) Int. Cl.
*B60N 2/60* (2006.01)
*B60N 3/00* (2006.01)
B60R 7/04 (2006.01)
B60R 11/00 (2006.01)

(52) U.S. Cl.
CPC ............ *B60N 2/6009* (2013.01); *B60N 3/00* (2013.01); *B60R 7/043* (2013.01); *B60R 2011/0007* (2013.01)

(58) Field of Classification Search
CPC ................... B60N 3/00; B60N 2/6009
See application file for complete search history.

(56) References Cited

U.S. PATENT DOCUMENTS

| | | | | |
|---|---|---|---|---|
| 5,887,941 A | * | 3/1999 | Kopinski | B60N 2/24 297/182 |
| 6,746,069 B1 | * | 6/2004 | McKenzie | B60N 2/6009 2/48 |
| 7,758,090 B2 | * | 7/2010 | Gregory | B60N 2/6009 297/182 |
| 8,454,085 B1 | | 6/2013 | Hsu | |
| 8,672,401 B2 | | 3/2014 | Schreiber | |
| 9,701,233 B1 | * | 7/2017 | Farooq | B60N 3/00 |
| 9,981,610 B2 | * | 5/2018 | Robins | B60R 7/043 |
| 10,894,494 B2 | * | 1/2021 | Cunningham | B60N 2/6009 |
| 11,155,194 B2 | * | 10/2021 | Hodgson | B60N 3/002 |
| 2005/0017036 A1 | * | 1/2005 | Dahl | B60N 3/108 224/510 |
| 2009/0127882 A1 | * | 5/2009 | Thibodeau | B60R 7/043 296/1.07 |
| 2011/0266820 A1 | * | 11/2011 | Hurwitz | B60N 2/6009 296/1.07 |
| 2018/0361899 A1 | * | 12/2018 | Baroody | B60N 3/00 |

FOREIGN PATENT DOCUMENTS

DE 102015219158 A1 4/2017
JP 2007210390 A 8/2007

* cited by examiner

*Primary Examiner* — Scott T McNurlen
(74) *Attorney, Agent, or Firm* — Dinsmore & Shohl LLP

(57) ABSTRACT

A vehicle includes a driver seat, a front passenger seat and a console assembly located between the driver seat and the front passenger seat. At least one of the driver seat and the front passenger seat is spaced from the console assembly in a vehicle lateral direction forming a gap between the console assembly and the at least one of the driver seat and the front passenger seat. A retractable cover assembly includes a flexible, sheet-form cover that is connected to a retract device that takes up or pays out the cover between extended and retracted configurations.

4 Claims, 2 Drawing Sheets

RETRACTABLE COVER ASSEMBLIES THAT REMOVABLY COVER GAPS BETWEEN VEHICLE SEATS AND CENTER CONSOLES

TECHNICAL FIELD

The present specification generally relates to center console assemblies and, more specifically, to retractable cover assemblies that removably cover gaps between vehicle seats and center consoles.

BACKGROUND

In many seating configurations of automobiles, there are gaps between front seats of the automobiles and center consoles. The gaps facilitate forward and rearward movement of the front seats relative to the center consoles without rubbing between the front seats and the center consoles. With the gaps present, vehicle passengers may drop objects or objects may otherwise fall into the gaps and onto the floor. Given the widths of the gaps, it can be difficult for a passenger to retrieve the objects with their hands. The gaps may not be wide enough to allow the passengers to reach their items and the items may migrate to underneath the seats making them even more difficult to retrieve.

Gap blockers exist that are solid pieces of material that are placed within the gaps. These gap blockers must be removed when unwanted and stored somewhere in the vehicles or otherwise taking up space within the vehicles or outside the vehicles where they are not readily available from within the vehicles.

Accordingly, a need exists for retractable cover assemblies that removably cover gaps between vehicle seats and center consoles.

SUMMARY

In one embodiment, a vehicle includes a driver seat, a front passenger seat and a console assembly located between the driver seat and the front passenger seat. At least one of the driver seat and the front passenger seat is spaced from the console assembly in a vehicle lateral direction forming a gap between the console assembly and the at least one of the driver seat and the front passenger seat. A retractable cover assembly includes a flexible, sheet-form cover that is connected to a retract device that takes up or pays out the cover between extended and retracted configurations.

In another embodiment, a console assembly for a vehicle includes a console housing and a retractable cover assembly located in the console housing. The retractable cover assembly includes a flexible, sheet-form cover that is connected to a retract device that takes up or pays out the cover between extended and retracted configurations.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include a passenger compartment having an instrument panel and at least two seats, a driver seat and a front passenger seat. Between the driver seat and the passenger seat and rearward of the instrument panel is a console assembly. The console assembly extends rearward from the instrument panel in a vehicle longitudinal direction. The console assembly may be mounted in-between the driver seat and the front passenger seat, and immediately rearward of the instrument panel so that a portion the console assembly may be incorporated with the instrument panel.

The console assembly may include a storage compartment. The storage compartment may include a console housing that has a floor, a pair of sidewalls, and a pair of end walls so as to define a storage area. The console housing includes an opening permitting access to the storage area. Further, the storage compartment may include a lid assembly. The lid assembly may be pivotally connected to the console housing at the rear wall of the pair of end walls at a hinged connection.

Gaps may be provided between the driver seat and the console assembly and the front passenger seat and the console assembly. The gaps can provide spacing between the console assembly and the driver and front passenger seats. The spacing can facilitate forward and rearward movement of the driver and front passenger seats relative to the console assembly without the driver and front passenger seats rubbing against the console assembly. A retractable cover assembly includes a flexible cover and a retract device that includes a roller and an actuator that is operatively connected to the roller. An end of the flexible cover is connected to the roller such that the flexible cover winds around the roller to a stowed configuration as the roller is rotated in a take up direction and pays out from the roller as the roller is rotated in a pay out direction. The retract device may be located within the console housing so that the flexible cover can be rolled up inside the console housing in the retracted configuration.

It should be appreciated that the console assembly may be provided at any suitable position within a vehicle, such as between a pair of front row seats, a pair of second or third row rear seats, etc. No matter where the console assembly is within the vehicle, the console assembly may be provided with a retractable cover assembly. The console assembly is typically provided within a center console of a vehicle as described above. While the embodiments described herein are described in reference to a console assembly having an interior cavity used as a storage area, the embodiments are not limited thereto. For example, in some embodiments, the storage area of the console assembly may include, without limitation, other vehicle accessories such as receptacles (e.g., a cup holder), ashtrays, electronic components, HVAC, and/or audio component controls, etc.

Figure 1:
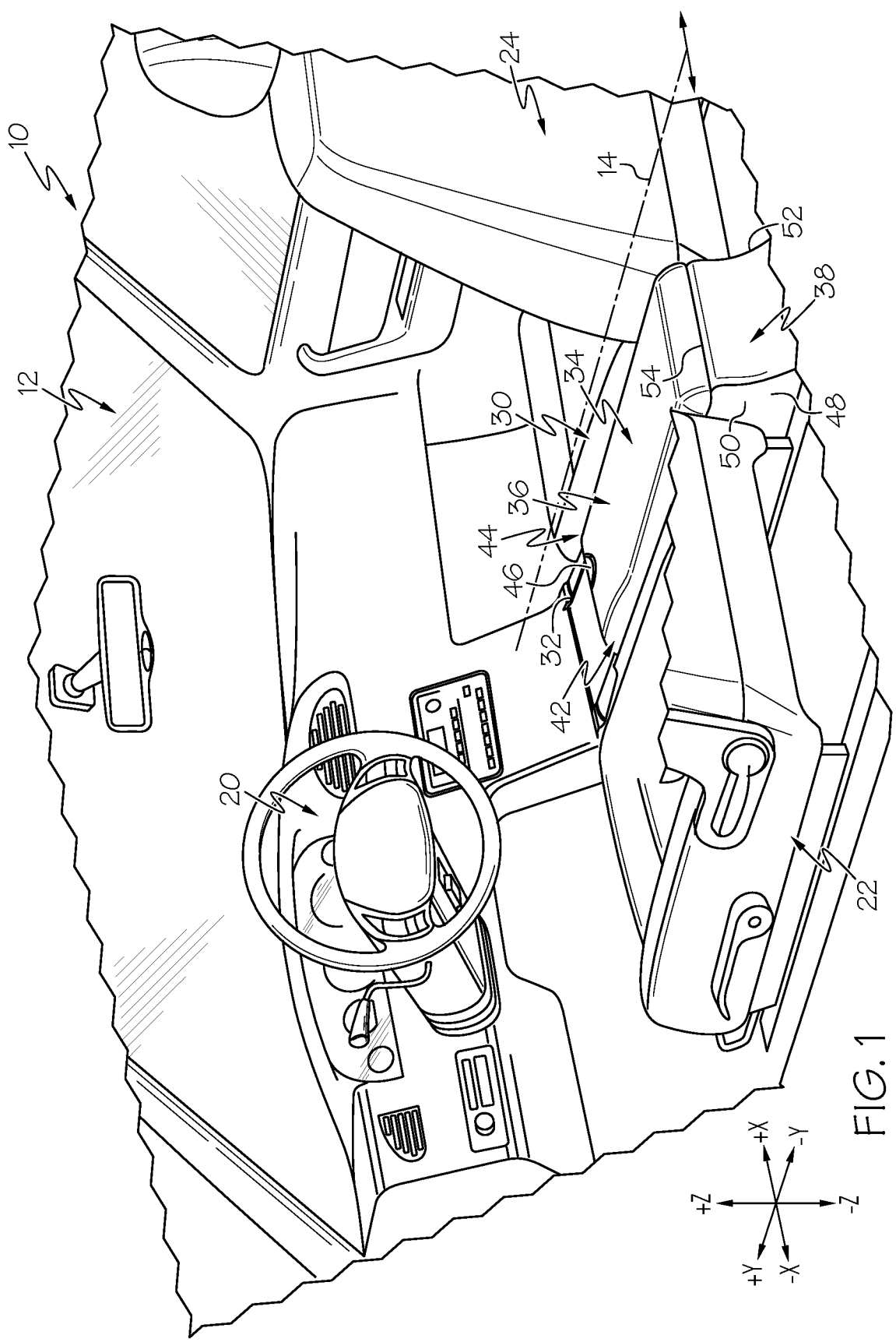
FIG. 1 depicts a partial perspective view of a passenger compartment for a vehicle including a console assembly, according to one or more embodiments described and illustrated herein.

As used herein, the term "vehicle longitudinal direction" refers to the forward-rearward direction of the vehicle (i.e., in the +/−vehicle Y direction depicted in FIG. 1). The term "vehicle lateral direction" refers to the cross-vehicle direction (i.e., in the +/−vehicle X direction depicted in FIG. 1), and is transverse to the vehicle longitudinal direction. The term "vehicle vertical direction" refers to the upward-downward direction of the vehicle (i.e., in the +/−vehicle Z-direction depicted in FIG. 1). As used herein, "upper" and "above" are defined as the positive Z direction of the coordinate axis shown in the drawings. "Lower" and "below" are defined as the negative Z direction of the coordinate axis shown in the drawings.

The terms "outboard" or "outward" as used herein refers to the relative location of a component in direction 16 with respect to a vehicle centerline 14. The term "inboard" or "inward" as used herein refers to the relative location of a component in the direction opposite of "inboard" or "inward." Because the vehicle structures may be generally symmetrical about the vehicle centerline 14, the direction to which use of terms "inboard," "inward," "outboard" and "outward" refer may be mirrored about the vehicle centerline 14 when evaluating components positioned along opposite sides of the vehicle 10.

Referring to FIG. 1, a partial perspective view of a passenger compartment 12 of a vehicle 10 is depicted. The passenger compartment 12 includes a driver area and a passenger area. An instrument panel 20 is provided within the passenger compartment 12. The instrument panel 20 generally extends in the vehicle lateral direction and includes, without limitation, an instrument cluster, a radio, and a climate control cluster including a plurality of individual vents. Further, the passenger compartment 12 includes a driver seat 22 and a front passenger seat 24. Located adjacent the driver seat 22 are the controls to the vehicle 10 such as, without limitation, a steering wheel, a gas pedal, and a brake pedal. It should be appreciated that the passenger compartment 12 may include a plurality of passenger seats rearward of the front passenger seat 24 in a vehicle longitudinal direction.

Generally, between the driver seat 22 and the front passenger seat 24 is a console assembly 30. The console assembly 30 generally extends in the vehicle longitudinal direction extending from the instrument panel 20 ending at or slightly beyond a rear surface of the driver seat 22 and the front passenger seat 24. Further, the console assembly 30 generally extends in the vehicle lateral direction an equal distance outwardly from the vehicle centerline 14, limited in width by the distance between the driver seat 22 and the front passenger seat 24 and gaps 42 and 44 that are located between the console assembly 30 and the driver and front passenger seats 22 and 24. The console assembly 30 includes a forward portion 32 and a rearward portion 34, the forward portion 32 being closer to the instrument panel 20 than the rearward portion 34. In some embodiments, the forward portion 32 may include cup holders, change holders, sliding trays, or other compartments for holding material. Disposed within the rearward portion 34 of some embodiments of the console assembly 30 is a lid assembly 36 and a button 46 that can be used to open the lid assembly 36 and expose a storage compartment 38.

The storage compartment 38 may be integrated with the console assembly 30 and is enclosed by a console housing 48. The storage compartment 38 may have one or more storage trays, such as a sliding tray, or other implementations for organizing items within the storage compartment 38. In some embodiments, the console housing 48 is integrated with the console assembly 30 and the instrument panel 20. In some other embodiments, the console housing 48 may be separated from the instrument panel 20.

The button 46 or other suitable device may be configured to allow access to the storage compartment 38 of the console assembly 30. For example, the button 46 may be configured with a snap fit connection that, when pushed, unlatches the lid assembly 36 and allows the lid assembly 36 to be opened. In some embodiments, the button 46 is biased, such as, for example, by a spring such that the top surface of the button is accessible to the touch of a user and pressure actuated, such that when a user presses the button 46, access is granted to the storage compartment 38. However, it is contemplated that embodiments may include any type of device that allows a user to selectively access the storage compartment 38.

The console housing 48 may surround the button 46 and comprise a pair of console housing sidewalls 50, 52. The console housing sidewalls 50, 52 may interface with the lid assembly 36, for example, the console housing 48 may contact portions of the lid assembly 36 when the lid assembly 36 is in a closed position as shown.

The lid assembly 36 may be hingedly connected to the console housing 48 at hinged connection 54. The hinged connection 54 may permit a user of the vehicle to selectively open and close the lid assembly 36 by swinging the lid assembly 36 up or down about the hinged connection 54. While the particular embodiment shown utilizes a hinged connection at the rearward end of the console assembly 30, other methods of joining the lid assembly 36 and the console housing 48 that allow access to the storage compartment 38 are contemplated, such as, for example, a hinged connection on either lateral edge (i.e., right or left edge) of the center console, or for example, a sliding connection, wherein a lid assembly of the console assembly 30 slides rearward or forward allowing access to the storage compartment 38.

Figure 2:
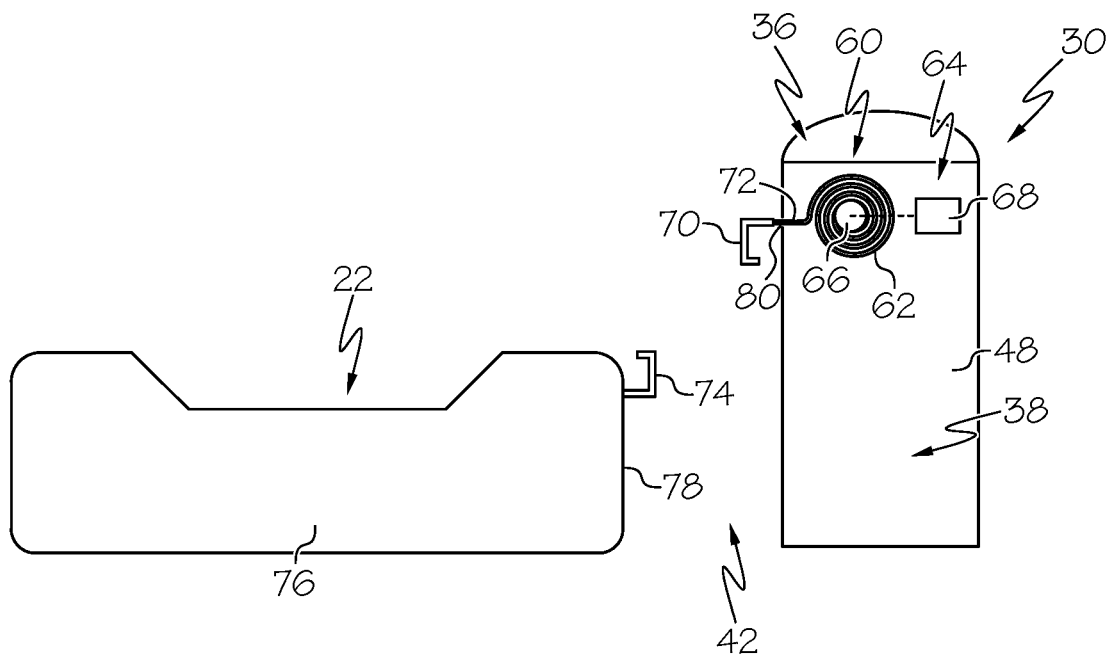
FIG. 2 is a diagrammatic illustration of a console assembly with a retractable cover assembly in a stowed configuration, according to one or more embodiments shown and described herein.

Referring to FIG. 2, the console assembly 30 is illustrated diagrammatically including the console housing 48 that is located adjacent the driver seat 22 and the gap 42 between the driver seat 22 and the console assembly 30. A retractable cover assembly 60 includes a flexible, sheet-form cover 62 (e.g., a plastic sheet and/or fabric material) and a retract device 64 that is located inside the console assembly 30. The retract device 64 may be located within the storage compartment 38, within the lid assembly 36 and/or within a compartment that is divided from the storage compartment 38. The retract device 64 includes a roller 66 and an actuator 68 that is operatively connected to the roller 66. The actuator 68 may be a motor or, in some embodiments, the actuator 68 may be a spring, such as a coil spring that is inside the roller 66. A ratchet device may inhibit rotation of the roller 66 in the take up direction and may be used to inhibit unintended rotation of the roller 66 and retraction of the cover 62. The cover 62 may include a latch member 70 (e.g., a hook, snap, hook and loop, etc.) located at an edge 72 of the cover 62. The latch member 70 may be latched to a mating latch member 74 located on a seat member 76 of the driver seat 22 or passenger seat 24. In the illustrated embodiment, the mating latch member 74 is located at a side 78 of the seat member 76; however, the mating latch member 74 can be located at any suitable location.

Figure 3:
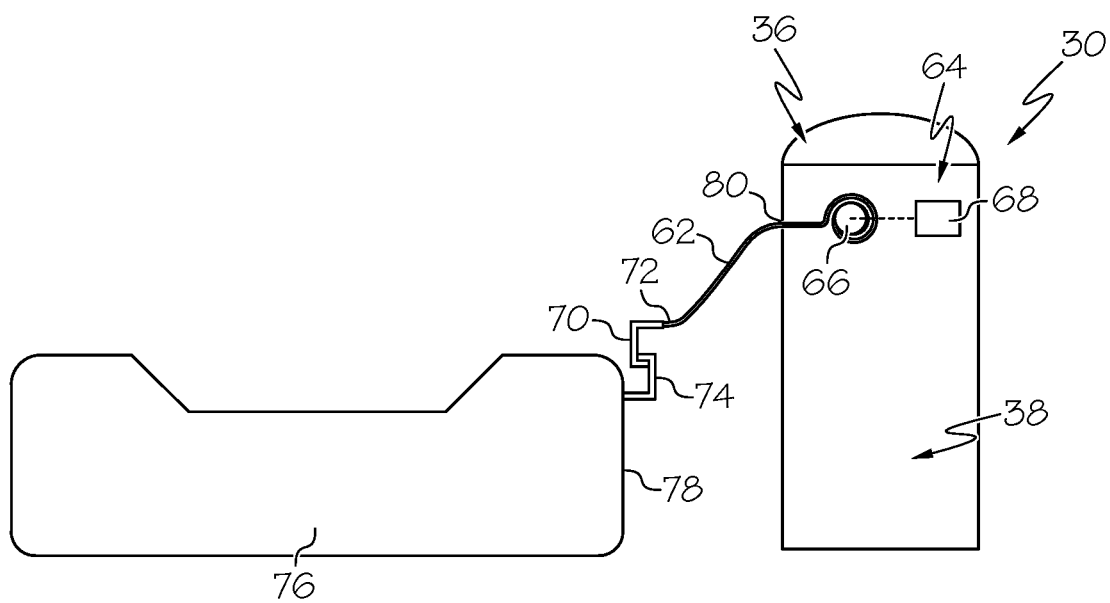
FIG. 3 is a diagrammatic illustration of the console assembly with retractable cover assembly of FIG. 2 in an extended configuration, according to one or more embodiments shown and described herein.

FIG. 2 illustrates the retractable cover assembly 60 in a retracted, stowed configuration. The latch member 70 may inhibit the cover 62 from being retracted entirely through an opening 80 in the console housing 40 in the stowed configuration to facilitate grasping of the latch member 70. Referring to FIG. 3, the retractable cover assembly 60 is illustrated in an extended configuration with the cover 62 extending over the gap 42 and the latch member 70 engaged with the mating latch member 74. Grasping the latch member 70 and pulling the cover 62 causes the roller 66 to rotate and extend the cover 62 in a pay out direction. In some embodiments, rotating the roller 66 in the pay out direction causes a spring (represented by element 68) to tighten thereby biasing the roller toward the stowed configuration. After use, the latch member 70 may be unlatched from the mating latch 74 and the cover 62 may be returned to the stowed configuration as represented by FIG. 2.

The above-described console assemblies provide cover assemblies that include covers that can be used to cover gaps between vehicle seats and center consoles. The cover assemblies may include a retract device that can be used to retract the covers from their extended positions covering the gaps to stowed positions. The retract devices can be located inside the console assemblies. In other embodiments, the retract devices may be located on the vehicle seats. For example, the retract devices may be located in a housing that is mounted on a side of the vehicle seats and the mating latch member may be located on the console assembly. In some embodiments, the retractable cover assembly may be formed separately from the vehicle and then mounted to the console assembly or the vehicle seat.

It is noted that the terms "substantially" and/or "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a driver seat;
   a front passenger seat;
   a console assembly located between the driver seat and the front passenger seat, wherein the driver seat is spaced from the console assembly in a vehicle lateral direction forming a gap between the console assembly and the driver seat; and
   a retractable cover assembly comprising a flexible, sheet-form cover that is connected to a retract device that takes up or pays out the cover between extended and retracted configurations;
   wherein the retract device comprises a roller that rolls up the cover, the roller located in the console assembly, the cover configured to extend from the roller through an opening in a side of the console assembly that is above a seat member of the driver seat such that the cover extends downward at an angle toward the seat member in the extended configuration;
   wherein the driver seat comprises a top surface and a near side surface adjacent the console;
   wherein, in the extended configuration, the cover is connected to the near side surface of the driver seat.

2. The vehicle of claim 1, wherein the retract device comprises an actuator configured to rotate the roller in a take up direction.

3. The vehicle of claim 2, wherein the actuator comprises a spring that is operatively connected to the roller.

4. The vehicle of claim 3, wherein the cover comprises a latch mechanism configured to engage with a mating latch mechanism on the driver seat.

* * * * *